United States Patent [19]

Hemery

[11] Patent Number: 4,517,136
[45] Date of Patent: May 14, 1985

[54] PREPARING REINFORCED IMPERVIOUS ARTICLES

[75] Inventor: Andre Hemery, Les Andelys, France

[73] Assignee: Allibert S.A., France

[21] Appl. No.: 411,884

[22] Filed: Aug. 26, 1982

[30] Foreign Application Priority Data

Sep. 18, 1981 [FR] France ................................ 81 17615

[51] Int. Cl.³ .............................................. B29C 6/04
[52] U.S. Cl. ......................................... 264/25; 264/80;
264/261; 264/263; 264/265; 264/274; 264/275;
264/277; 264/273
[58] Field of Search ............... 264/263, 265, 261, 274,
264/275, 25, 80, 277, 273

[56] References Cited

U.S. PATENT DOCUMENTS

| | | | |
|---|---|---|---|
| 2,738,977 | 3/1956 | Riley | 264/263 |
| 3,223,056 | 12/1965 | Wilburn | 264/263 |
| 3,387,075 | 6/1968 | Wilcox | 264/263 |
| 3,855,029 | 12/1974 | Sabel | 264/263 |
| 3,896,199 | 7/1975 | Michaelis | 264/263 |
| 4,052,499 | 10/1977 | Goupil et al. | 264/265 |

FOREIGN PATENT DOCUMENTS 2460258  1/1981  France ................ 264/273
294750   4/1971  U.S.S.R. .............. 264/265

Primary Examiner—James Lowe
Attorney, Agent, or Firm—Steinberg & Raskin

[57] ABSTRACT

An impervious article of plastic material including a reinforcing frame member imperviously sealed within the plastic material which forms an outer covering thereof, is obtained by disposing the reinforcing frame member within a channel formed in shock resistant thermoplastic material, by heating a portion of the shock resistant thermoplastic material on outer sides thereof opposite sides defining the channel in which the reinforcing member is disposed, and over an area near an open portion of the channel to at least the softening point of the shock resistant plastic material, and then injecting a compatible plastic material substantially resistant to cracking under stress onto the outer sides of the thermoplastic material and over the open part of the channel in which the reinforcing member is disposed. Then the injected plastic material and the heated portion of the thermoplastic material are allowed to cool, so that the injected plastic material becomes heat welded to the thermoplastic material to thus form a capping over the reinforcing frame member substantially resistant to cracking under stress.

9 Claims, 5 Drawing Figures

PREPARING REINFORCED IMPERVIOUS ARTICLES

BACKGROUND OF THE INVENTION

The object of the present invention is a process which permits improved covering of the frame of an article of plastics material which is internally reinforced and concerns reinforced plastics articles thus obtained.

For various applications, and especially to form crates to hold heavy loads or to form handling pallets, the conventional plastics materials, even those of good quality, have insufficient rigidity and strength under load. One solution which has been adopted consists in reinforcing these articles by means of internal framework members.

Thus, in the earlier French patent filed in the name of the Applicants, No. 7917420 dated June 29th, 1979, there are described articles of plastics material internally reinforced by means of wooden frame members. The processs described in this earlier application is equally applicable if the frame members are of a different nature, for example of metal.

The manufacturing problem which arises is the moulding of the plastics materials onto the frame. A priori, this could not cause manufacturing problems if the plastics material were not subject to any substantial shrinkage during cooling after having been moulded onto the frame. Now, the shock-resistant plastics materials which are used for such articles, for example high density polyethylene, are highly subject to cracking under stress, or have other disadvantages. Consequently, it has been proposed to coat the framework by means other than a single over-moulding. Thus, according to the previously-mentioned patent, open channels are formed in the shock-resistant plastics material in which the frame members are positioned. After this, the opening in the channel is closed by moulding, onto the framework and a portion of the external wall of the channel, a material which is not susceptible to cracking under strain. As the latter cannot be sufficiently welded to the exterior walls of the channel, there is obtained over and above the shrinkage grip, a mechanical connection between the frame, channels, and over-moulded article by providing grooved throats in the frame, and facing orifices in the channels, so as to obtain a bond between the added piece and the framework via the channels which surround it thanks to connecting and locking pins.

SUMMARY OF THE INVENTION

The object of the present invention is to offer another means of enclosing the framework and of bonding the assembly and of guaranteeing the imperviousness of the cavities in which the frame members are enclosed. It concerns a process which permits there to be obtained total imperviousness of an article of shock-resistant plastics material, internally reinforced with frame members, especially of wood, which become protected from the weather, an article in which the frame is inserted in advance into an open channel, which permits its introduction and positioning within the article, the process being characterized according to the invention in that after positioning of the frame member in the said channel, the external walls of the channel are heated in the neighbourhood of its opening, after which, when they have sufficiently melted, a compatible plastics material which can become heat-welded onto the said walls and is scarcely susceptible to cracking under stress is injected under pressure onto these walls. In this manner, the double problem of imperviousness and of cracking under stress is solved, when it is desired to avoid direct over-moulding of the whole of the article onto the framework, especially with a view to enlarging the choice of plastics materials that can be used.

The invention is also directed to articles, especially crates and pallets, manufactured in accordance with this process.

BRIEF DESCRIPTION OF THE DRAWINGS

The invention and the method of putting it into practice will appear more clearly with the help of the following description, which is made with reference to the attached drawings wherein.

DETAILED DESCRIPTION OF A PREFERRED EMBODIMENT

Figure 1:
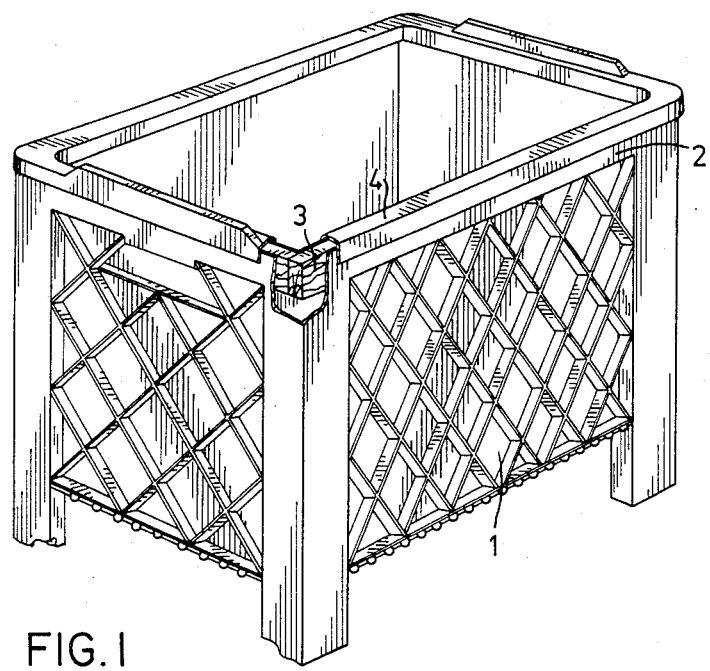
FIG. 1 is a perspective view partially broken away, showing a case moulded from plastics material including wooden frame members.

Reference will first be made to FIG. 1 in which there is shown by way of example the application of the process of the invention to an article of plastics material which is internally reinforced with wooden framework members and forms a crate. The crate, which as a whole is marked 1, has at its upper part an edge 2 reinforced by a wooden frame member 3. More precisely, as described in the above-mentioned patent No. 7917420, the frame members 3 are introduced into channels which are upwardly open and in the form of a U which form the upper plastics edge 2. In this manner, the frame members 3 can be introduced and put in position within the edge 2 without any mechanical strain being exerted on this edge, which may be formed in a single piece with the rest of the crate, from a plastics material which is shock-resistant but is susceptible to cracking under strain, such as high density polyethylene for example.

At this stage of the manufacture, it is necessary to close the opening in the channel which forms the upper edge 2 and into which the frame member 3 has been introduced, which is achieved by the positioning of a capping 4 of a plastics material which can be moulded on top of the edge 2. It is not possible to use for this capping the same material as that used for the remainder of the crate, which in the present example is high density polyethylene, because such a material moulded hot onto the border 2 and the frame member 3 would be subject to cracking as a result of the strain to which it would be subjected during contraction during cooling of the material.

Figure 2:
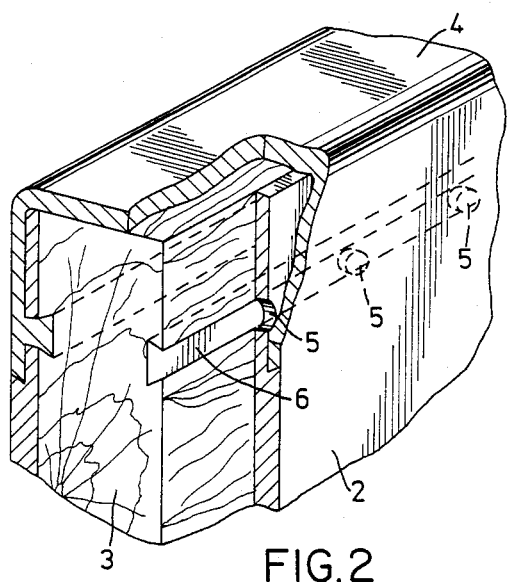
FIG. 2 shows on a larger scale the detail of the clsoing of the channel into which has been inserted a wooden frame member in accordance with the prior art.

In order to resolve this problem or cracking under strain, the above-mentioned patent suggests, as shown in FIG. 2, the over-moulding of the capping 4 which is of a plastics material which is scarcely subject to cracking under strain. In order to obtain good cohesion of the capping 4 moulded hot onto the cold wall 2 of the upper border of the crate, there are formed here and there orifices 5 in the wall 2, which orifices 5 face a dove-tailed-sectioned throat 6 formed in the frame member 3. Under these conditions, the moulded material of the capping 4 flows into the throat 6 and into the orifices 5, assuring good bonding of the cover onto the frame member 3 and the wall 2.

Figure 3:
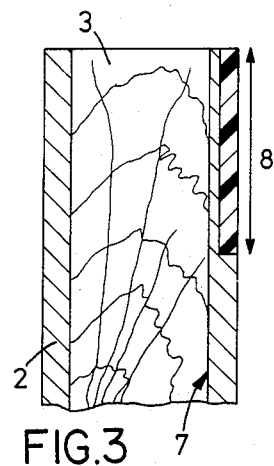
FIG. 3 shows schematically and in cross-section how, in accordance with the present invention, the part of the article which includes a channel and a wooden frame member is prepared with a view to impervious closing of the channel.
Figure 4:
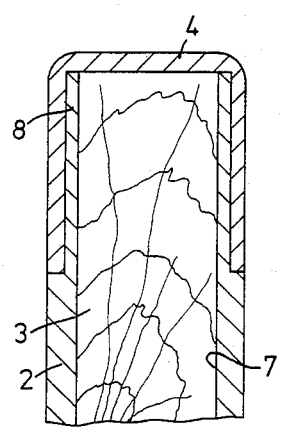
FIG. 4 shows a section, as in FIG. 3, how, in accordance with the present invention, the article appears when the channel containing the frame member has been imperviously closed.

FIGS. 3 and 4 will now be referred to, in which there is illustrated the carrying out of the invention.

In accordance with the invention, when the frame member 3 has been placed inside the upper edge 2 of the crate, the wall of the channel 7 is heated from the outside, for example over the height 8 adjacent to the channel opening 7 and over a depth which is preferably between a quarter and three quarters, for example substantially half, of the thickness of this part, as shown in heavy shading in the right-hand portion of FIG. 3, so as to soften the heated surface over the indicated depth. This heating can be effected in any appropriate manner, for example by radiation, by the known process called "au-miroir" (reflection) in other words by means of heating blades (not shown) which are brought close to the walls 8, or by means of a flame or by a current of warm air.

Once the thermoplastics material has thus been softened and heated, the material which will form the capping 4 is injected rapidly by over-moulding, and the two materials become welded and intermingled over a slight depth within the melting zone over height 8 of the walls 2. Thus, there is obtained an impervious capping of the channel 7, which ensures the final protection of the frame member 3. It may be noted from FIG. 4 that the wall of the completed piece displays practically no thickening.

Figure 5:
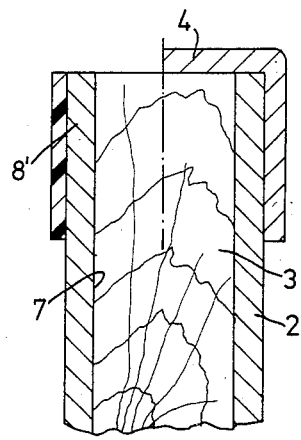
FIG. 5 shows in two half-sections, as in FIGS. 3 and 4, another variation of carrying out the process of the present invention.

In the variation illustrated in FIG. 5, the upper part 8' of the channel 7 displays initially a thickening with reference to the wall 2, so as to preserve at the wall 8 of the channel a hatched thickness after heating which is not sufficiently melted. The method of assembly is the same as that described for FIG. 3. In this case, the wall of the completed article displays a certain thickneningas appears in the right-hand half-section of the figure.

In order to obtain the best results, compatible plastics materials will be chosen.

For example, the largest part of the article can be formed from highly shock-resistant high density polyethylene. The material of the cover 4 can then be constituted by a low density polyethylene which is less rigid but less subject to cracking under strain. In that the capping 4 is situated in a part of the crate which is subject to little loading, this does not cause any problems as far as the strength of the crate is concerned.

Instead of low density polyethylene, other materials may equally well be chosen, such as for example medium density polyethylene, polyethyl vinyl acetate (EVA), polyethylene-ethyl acrylate (EEA), a mixture of these compounds or analogues thereof, such as a copolymer of ethylene and acrylic acid (EAA), for example.

For example, good results have been obtained with the following combinations of materials:

high density polyethylene for the crate/low density polyethylene for the capping, high density polyethylene for the crate/50/50 mixture of low density polyethylene and EEA.

As low density polyethylene, the product Vestolen 3513 from Hüls, Hostalen GP No. 6250 from Hoechst, or similar products from other manufacturers may be used.

As base material for the crate there may equally well be used a shock-resistant type of polypropylene, and as capping material also a polypropylene of the same reference.

I claim:

1. A process for preparing an impervious article including a reinforcing frame member disposed between shock resistant, thermoplastic walls, comprising the steps of
    disposing the reinforcing frame member between the shock resistant, thermoplastic walls,
    after disposing the reinforcing frame member between the shock resistant, thermoplastic walls, heating the walls of shock resistant, thermoplastic disposed on either side of the reinforcing frame member, the walls defining a channel in which the reinforcing frame member is situated, the channel open on one side thereof, said heating carried out along an area of the walls on outer sides thereof opposite sides defining the channel and over an area proximate to the open part of the channel, to at least the softening point of the shock resistant, thermoplastic in the areas of the walls, over a depth between about $\frac{1}{4}$–$\frac{3}{4}$ of the respective thicknesses of the walls,
    after softening of the areas of the walls, and while the walls are in softened condition, injecting under pressure onto the outer sides of these walls and over the open part of the channel, a compatible plastic material substantially resistant to cracking under stress, and
    allowing the injected plastic material and the heated areas of the walls to cool, whereby the injected plastic material becomes heat welded to the walls to form a capping material over the reinforcing frame member substantially resistant to cracking under stress.

2. Process according to claim 1, characterised in that the heating of the walls is carried out by radiation.

3. Process according to claim 1, characterised in that the heating of the walls is carried out by heating blades according to the process known as "au miroir" (reflection).

4. Process according to claim 1, characterised in that the heating of the walls is carried out by means of a flame.

5. Process according to claim 1, characterised in that the heating of the walls is carried out by means of hot air.

6. Process according to claim 1, characterised in that there is used as the walls for the article, a high density polyethylene or analogue thereof which is resistant to shock and as capping material for the channels, a low or medium density polyethylene, polyethyl vinyl acetate (EVA), polyethylene ethyl acrylate (EEA), a copolymer of ethylene and acrylic acid (EAA), a mixture of these compounds, or analogues thereof.

7. Process according to claim 1 characterised in that as walls there is used a shock resistant type of polypropylene and as capping material also a polypropylene of the same reference.

8. The process of claim 1 wherein the reinforcing frame member is made of wood.

9. The process of claim 1 wherein the walls are softened over a depth about $\frac{1}{2}$ the thickness of the respective walls.

* * * * *